Patented July 26, 1949

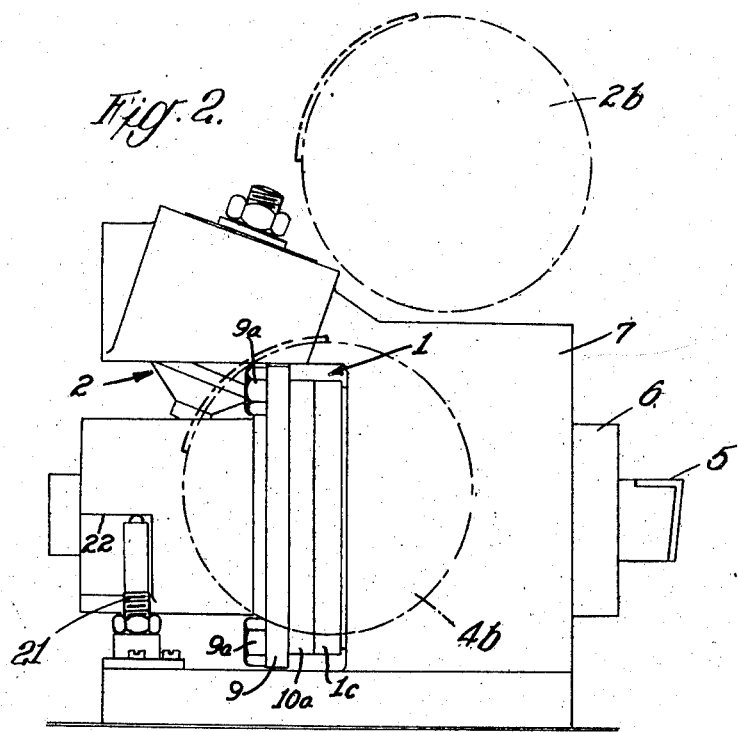

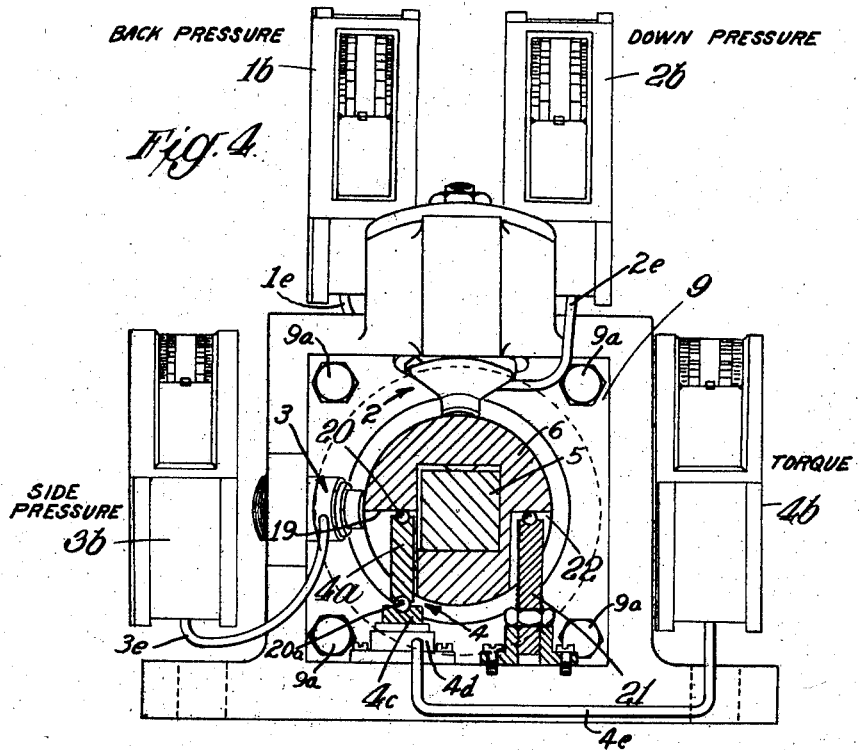

2,477,457

UNITED STATES PATENT OFFICE 2,477,457

DEVICE FOR MEASURING THE PRESSURE EXERTED ON CUTTING TOOLS

Albert T. Hughes, Mold, North Wales

Application July 31, 1946, Serial No. 687,496
In Great Britain July 30, 1945

Section 1, Public Law 690, August 8, 1946
Patent expires July 30, 1965

7 Claims. (Cl. 73—104)

This invention relates to devices for measuring forces exerted in various directions on cutting tools of machines such as lathes, planing machines and the like.

In accordance with the invention the cutting tool is mounted in a tool holder which has a portion arranged as a ball joint or the like in a rigid housing so that it may move in any direction in the housing. A portion of the seating for the tool holder in the housing is formed by a static pressure transmitting device which will indicate the load applied to the tool with practically no movement. In addition the tool holder is fitted with contacts say in line or at any tangent to the tool, each cooperating with a separate static pressure transmitting device to measure the force in any other direction. By this arrangement each force is measured in the direction in which it is applied and with practically no movement.

Each of the static pressure transmitting devices may be connected by fluid pressure conduits with pressure gauges suitably disposed.

One embodiment of the invention applied to a lathe-tool machinability testing machine is illustrated in the accompanying drawings in which Fig. 1 is a longitudinal vertical axial section, Fig. 2 is a side elevation. Fig. 3 is a horizontal axial section and Fig. 4 is a rear elevation partly in section on the line C—C of Fig. 3.

As shown in Figs. 1 and 2, the cutting tool 5, the forces on which are to be measured, is mounted in a tool holder 6 by set screws 5a, the holder presenting a partly spherical surface 6a and supported on a partly spherical seating 8 of a ring 1a, in a rigid housing 7, this arrangement allowing for a small turning movement of the tool holder 6 in any direction. The ring 1a together with the channel ring 1c cooperate to provide an annular casing of a static pressure transmitting device indicated by the reference character 1, such device being adapted to measure the load applied to the tool 5 with practically no movement. The ring 1a includes a flange extending into the channel of the ring 1c so that an annular chamber 1d for pressure fluid is formed. The channel ring part 1 of the device 1c is held in position by a plate 9 bolted to the housing 7 by bolts 9a. A screw threaded collar 10 engaging the plate 9 and pressing against a washer 10a bearing on the ring 1c of the pressure transmitting device 1 serves to pre-load and position the transmitting device 1. A distance piece 11 interposed between the housing 7 and the ring 1a of the transmitting device serves to determine the forward position of the ring 1a of the transmitting device. The device 1 measures the thrust of the tool 5 in the rearward direction.

The upper side of the tool holder 6, as shown in Figs. 1 and 2, is provided with a pressure transmitting device 2 mounted in a vertical plane containing the axis of the tool 5 and set at a slight forward inclination. The device 2 comprises a channel ring 2a with a downwardly projecting annular channel and a member 2c including an annular flange extending into the channel of the ring 2a to form a chamber 2d for pressure fluid. The member 2c rests upon a ball contact 13 engaging an inclined surface 13a on the upper portion of the tool holder 6. The channel ring 2a is mounted in an opening 12 in the upper part of the housing 7 and is carried by a member 12a bolted to a plug 12b threaded into the outer portion of the opening 12. A screw threaded plug 14 projects from the housing 7 and has a ball contact bearing on the end of the tool holder remote from the surface 13a serving to pre-load the transmitting device 2 and position the tool holder 6. This second device 2 serves to measure the tangential force applied to the tool by the work.

The side of the tool holder 6 as shown in Figs. 3 and 4 is provided with a pressure transmitting device 3 mounted in a horizontal plane containing the axis of the tool 5 and inclining forwardly. The device 3 comprises a channel ring 3a with a downwardly projecting channel and a member 3c including an annular flange extending into the channel of the ring 3a to form a chamber 3d. The member 3c carries a ball contact 16 bearing on an inclined surface 17 on the side of the tool holder 6. The channel ring 3a is carried by a member 15a bolted to a plug 15b threaded into an opening 15 inside of the housing 7.

A screw threaded plug 18 in the housing 7 at the end of the tool holder remote from the surface 17 and in the same horizontal plane as the transmitting device 3 is provided with a ball contact engaging the tool holder 6. The plug 18 serves to pre-load the transmitting device 3 and position the tool holder. This third transmitting device 3 serves to measure the longitudinal force applied to the tool by the work.

A fourth pressure transmitting device 4 is mounted between the base of the housing 7 and a surface 19 of the tool holder 6, said surface lying in a horizontal plane passing through the axis of the tool 5 as shown in Fig. 4. One part 4c of the pressure transmitting device 4 is a plunger extending into a chamber for pressure fluid in a base portion 4d, secured to the housing 7 by screws as shown. The device 4 also includes a vertical bar 4a, the lower end of which rests upon a ball 20a carried by the plunger 4c. The upper end of the bar 4a carries a ball 20 contacting with the surface 19 of the tool holder 6.

A screw threaded plug 21 on the opposite side of the axis of the tool holder 6 from the transmitting device 4, as shown in Fig. 4, carries a ball contact abutting against a surface 22 in tool holder 6 at the plane of the surface 19. The plug 21 serves to preload the transmitting device 4 and position the tool holder 6. This fourth static pressure transmitting device serves to measure the torque applied to the tool by the work.

Pressure gauges 1b, 2b, 3b and 4b, shown in Fig. 4, two of which are also shown by dot-and-dash lines in Fig. 2, are provided for indicating the pressures applied in the various directions as transmitted by the devices 1, 2, 3 and 4, the fluid pressure chambers of which are respectively connected by means of conduits 1e, 2e, 3e and 4e to the pressure gauges.

I claim:

1. A lathe tool machinability testing machine including a partly spherical tool holder mounted in partly spherical seatings in a rigid housing to allow a universal turning movement of the tool holder, a static pressure transmitting device forming part of the spherical seating at the rear of the tool holder and serving to measure the rearward thrust on the tool, a static pressure transmitting device interposed between an abutment lying in the vertical axis of the tool holder and the housing, and static pressure transmitting devices operable by abutments one lying in a horizontal plane including the horizontal axis of the tool holder and serving to measure the longitudinal force on the tool and the other abutment lying in a vertical plane intersecting the horizontal axis of the tool holder and serving to measure the torque on the tool.

2. In a machine for measuring forces exerted between a cutting tool and a piece of material being cut thereby, a rigid housing for a tool holder, a tool holder mounted therein, a ball and socket joint between the tool holder and the housing, a static pressure transmitting device arranged to transmit the backward thrust pressure on the tool having a portion arranged as a part of the ball and socket joint, and a plurality of seatings in the tool holder, a plurality of static pressure transmitting devices cooperating with the respective seatings in the tool holder and with the housing for transmitting and measuring forces applied to the tool in other directions.

3. A machine as defined by claim 2 including means for preloading each pressure transmitting device.

4. In a testing machine for testing the machinability of materials, a rigid housing for a tool holder including a pair of spherical socket seatings, a tool holder having a spherical portion mounted between the socket seatings of the housing whereby universal turning movement of the tool holder is permissible, and a static pressure transmitting device including the spherical seating of the housing at the rear of the tool holder, said device serving to measure the rearward thrust on the tool.

5. A machine as defined by claim 4 in which means is provided for preloading the pressure transmitting means.

6. A machine as defined by claim 5 in which the preloading means comprises a threaded sleeve acting upon the spherical seating at the rear of spherical portion of the tool holder, said seating at the rear of the tool holder being movable axially with respect to the housing.

7. A machine as defined by claim 4 characterized by including a static pressure transmitting device operable by an abutment on the tool holder and lying on a plane including the axis of the tool holder, and means for preloading said last-mentioned device.

ALBERT T. HUGHES.

REFERENCES CITED

The following references are of record in the file of this patent:

UNITED STATES PATENTS

| Number | Name | Date |
|---|---|---|
| 1,637,676 | Von Bohuszewicz et al. | Aug. 2, 1927 |
| 2,054,787 | Beavers et al. | Sept. 22, 1936 |